United States Patent [19]

Watanabe et al.

[11] Patent Number: 4,771,352
[45] Date of Patent: Sep. 13, 1988

[54] MAGNETIC TAPE CASSETTE WITH EASILY ASSEMBLED LID SPRING

[75] Inventors: Toshihiro Watanabe; Hiroshi Meguro, both of Miyagi, Japan

[73] Assignee: Sony Corporation, Tokyo, Japan

[21] Appl. No.: 18,539

[22] Filed: Feb. 25, 1987

[30] Foreign Application Priority Data

Mar. 14, 1986 [JP] Japan ............................. 61-037457[U]

[51] Int. Cl.$^4$ ............................................. G11B 23/02
[52] U.S. Cl. ..................................... 360/132; 242/199
[58] Field of Search ................ 360/132, 85, 93; 242/197, 198, 199; 206/387; 220/334, 341; 267/179, 155

[56] References Cited

U.S. PATENT DOCUMENTS 3,523,656  8/1970  Kamm ............................. 242/198
3,710,642  1/1973  Schneider ..................... 267/179 X
4,163,533  8/1979  Abe .................................. 242/198
4,579,295  4/1986  Harada ............................ 242/198
4,642,722  2/1987  Gebeke et al. .................. 360/132

FOREIGN PATENT DOCUMENTS 0125688  11/1984  European Pat. Off. .
1565181   4/1969  France .
2562703  10/1985  France .
2157265  10/1985  United Kingdom .

Primary Examiner—John H. Wolff
Assistant Examiner—Andrew L. Sniezeky
Attorney, Agent, or Firm—Lewis H. Eslinger; Donald S. Dowden

[57] ABSTRACT

A housing for a magnetic tape cassette has a front opening at which a magnetic tape is exposed and a front lid pivoting on a shaft to close the front opening. The spring which biases the front lid so as to close the front opening has a substantially U-shaped engagement end portion which engages a spring engagement projection extending in a direction substantially parallel to the shaft mounting the front lid so that the spring can be easily and positively attached to the front lid.

3 Claims, 6 Drawing Sheets

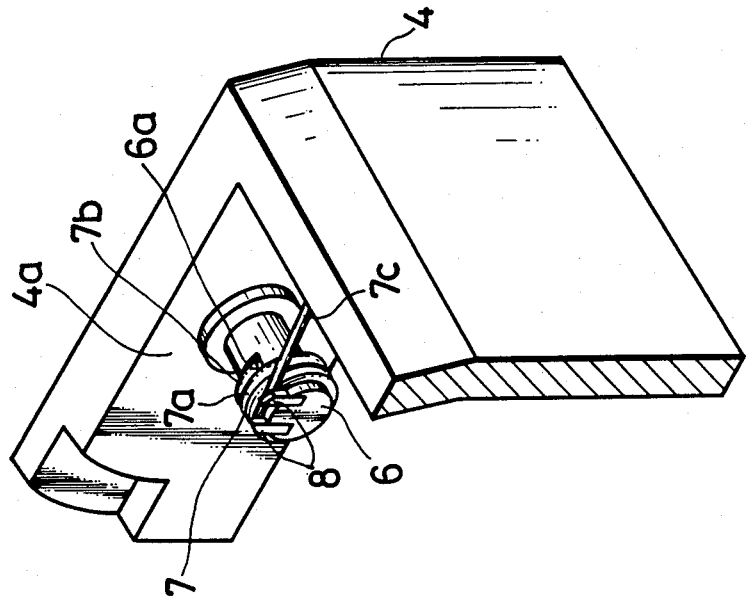
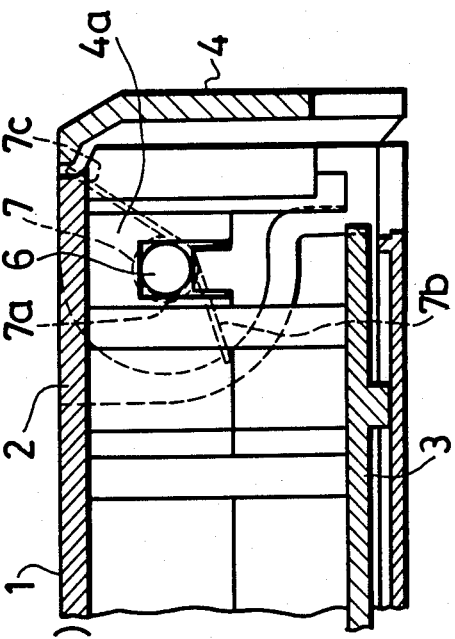
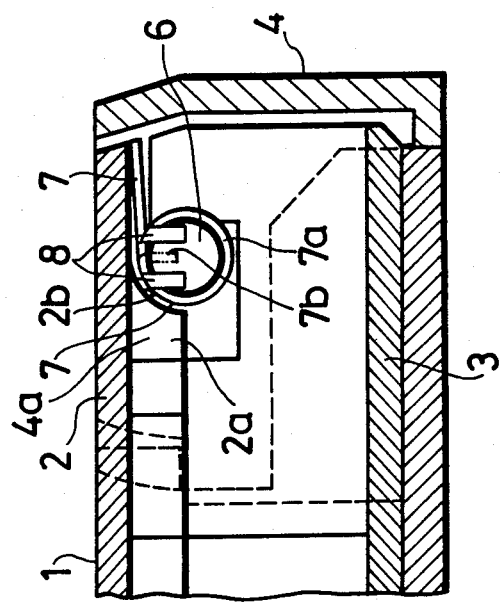

MAGNETIC TAPE CASSETTE WITH EASILY ASSEMBLED LID SPRING

BACKGROUND OF THE INVENTION

1. Field of the Invention

The present invention relates generally to magnetic tape cassettes used for recording digital signals such as PCM (pulse code modulated) signals and the like. More particularly, this invention relates to a novel construction of a magnetic tape cassette in which a spring is positively and easily attached to a front lid mounted pivotally to a cassette housing to close a front opening portion of the cassette housing at which a magnetic tape is exposed.

2. Description of the Prior Art

A PCM recording and/or reproducing apparatus has recently been proposed in which an analog signal, such as an audio signal or the like, is converted to a digital signal, for example a PCM signal, and then recorded on and/or reproduced from a magnetic tape. This PCM recording and/or reproducing apparatus can obtain a relatively high recording density by utilizing a rotary head. When the PCM recording and/or reproducing apparatus is to carry out the recording and/or reproduction by using the rotary head, the magnetic tape is withdrawn from a magnetic tape cassette through a front opening therein, wrapped around a rotary drum on which the rotary head is mounted and then the signal is recorded thereon and/or reproduced therefrom.

However, when oily components such as fingermarks, smudges, dust and so on adhere to the magnetic tape, dropout occurs in the signal reproduced from the magnetic tape. Therefore, it is necessary to enclose the magnetic tape as much as possible so as to protect it from contact with these oily components.

To this end, a type of magnetic tape cassette such as generally shown in FIGS. 1 and 2 has been proposed which has a rotatable front lid to close the front opening of the cassette housing at which the magnetic tape is exposed and through which it is withdrawn. This magnetic tape cassette has a cassette housing 1 which is formed of an upper half 2 and a lower half 3 coupled integrally by screws (not shown). A front lid 4 is pivoted at its side portions 4a to rotary shafts (not shown) on right and left side walls of cassette housing 1 near the front thereof to be freely rotatable. Springs (not shown) attached to the rotary shafts bias front lid 4 in the direction to cover or close the front opening of the cassette housing 1. When this tape cassette is used, front lid 4 is pivoted away from the front of cassette housing 1 to expose a magnetic tape 5 at the front opening.

One example of a prior art magnetic tape cassette of this kind is disclosed in Japanese published utility model application No. 60-17112. In such a magnetic tape cassette, as shown in FIG. 3 of the present application, a coiled portion 7a of a twist coiled spring 7 engages with rotary shaft 6 extending from the inner side surface of side portion 4a of front lid 4, with one end portion 7b of coiled spring 7 engaging front lid 4 and the other end portion 7c of coiled spring 7 engaging with cassette housing 1 to urge front lid 4 to rotate so as to close the front opening of cassette housing 1.

However, in this magnetic tape cassette, coiled spring 7 is engaged only with rotary shaft 6. Accordingly, when in the assembly process of this magnetic tape cassette attaching front lid 4 is attached to cassette housing 1, coiled spring 7 wobbles and rotates around rotary shaft 6 and easily falls off therefrom, making it difficult to engage coiled spring 7 with both front lid 4 and cassette housing 1.

Therefore, in order to remove these defects, another magnetic tape cassette has been proposed and is disclosed in Japanese laid-open utility model application No. 60-166880. FIGS. 4 and 5 are schematic representations illustrating the relevant portion of this previously proposed magnetic tape cassette. As shown therein front lid 4 has a spring engagement portion 8 formed at the projecting end or top of rotary shaft 6. Coiled portion 7a of coiled spring 7 engages rotary shaft 6 between engagement portion 8 and side wall 4a. One end portion 7b of coiled spring 7 is inserted into a concave engagement portion 6a formed on rotary shaft 6 and the other end portion 7c of coiled spring 7 contacts with and engages the upper surface of upper half 2 of cassette housing 1. In addition coiled portion 7a of spring 7 is supported against a spring supporting face 2b formed on a base portion 2a of upper half 2, preventing end portion 7b of spring 7 from coming out of concave portion 6a.

According to the prior art magnetic tape cassette illustrated in FIGS. 4 and 5, during the assembly process when coiled spring 7 is attached to rotary shaft 6 of front lid 4, coiled portion 7a of coiled spring 7 must be expanded along its diameter so as to enable coiled portion 7a to pass beyond spring engagement portion 8 to engage with rotary shaft 6 and end portion 7b of spring 7 must be engaged with concave portion 6a. This requires a significant amount of time and labor in attaching coiled spring 7 to front lid 4. In addition, upper half 2 must be provided with base portion 2a to form spring support face 2b, so that this magnetic tape cassette has a complicated construction and is both heavy and costly.

To avoid the above defects, yet another magnetic tape cassette has been proposed, as shown in FIGS. 6 to 8. FIG. 6 is a side view showing the relevant part of front lid 4 of the magnetic tape cassette, FIG. 7 is a cross-sectional view taken along line A—A' in FIG. 6 and FIG. 8 is a cross-sectional view taken along line B—B' in FIG. 6.

Referring initially to FIG. 6, in this magnetic tape cassette front and rear support members 9a and 9b are formed on the inner surface of side portion 4a of front lid 4 for association with end portion 7b of coiled spring 7. As shown in FIG. 7, front support member 9a projects upwardly in parallel to the inner surface of side portion 4a as an L-shaped member to support end portion 7b of coiled spring 7 at both its lower surface and its side surface. As shown in FIG. 8, rear support member 9b projects perpendicularly to the inner surface of side portion 4a so as to support the upper side surface of end portion 7b of the coiled spring 7, with the upper portion of rear support member 9b being tapering in an inclined plane towards the upper side thereof.

Spring 7 is attached to the front lid 4 as follows. Initially, coiled portion 7a of coiled spring 7 is engaged with rotary shaft 6. At this point, end portion 7b of coiled spring 7 contacts the upper end of front support member 9a, as shown by a broken line in FIG. 6. By pressing at the end of end portion 7b from above, end portion 7b of coiled spring 7 can be slid along the inclined plane of rear support member 9b in the direction shown by arrow D in FIG. 6 to engage with rear support member 9b as shown in FIG. 8.

As a result, both front and rear support members 9a and 9b receive end portion 7b of coiled spring 7 at its lower and upper surfaces respectively to positively attach coiled spring 7 to front lid 4.

However, spring 7 is necessarily very small and short and it is very difficult in practice to attach it to front lid 4 by pressing on the end of end portion 7b from above. In addition, spring 7 must be attached to front lid 4 by two separate movements in different directions. The first is the movement of spring 7 along rotary shaft 6 to attach it thereto and the second is the downward movement for engaging spring 7 with both front and rear support members 9a and 9b as described above. The requirement of two perpendicular movements makes the work of attaching spring 7 very troublesome and in particular creates great difficulties in automating the assembly process of this prior art magnetic tape cassette.

OBJECTS AND SUMMARY OF THE INVENTION

Accordingly, it is an object of this invention to provide an improved magnetic tape cassette which removes the defects encountered with the prior art magnetic tape cassettes.

It is another object of this invention to provide a magnetic tape cassette in which a spring can be attached to a front lid easily and positively.

It is another object of this invention to provide a magnetic tape cassette in which a spring can be attached to the front lid automatically.

It is a further object of this invention to provide a magnetic tape cassette which is considerably simplified in construction.

It is yet a further object of this invention to provide a magnetic tape cassette for which the assembly process can be improved in efficiency without increasing the manufacturing cost thereof.

In accordance with an aspect of the present invention, there is providing a magnetic tape cassette including a housing having a front opening portion and a front lid pivotally mounted in respect to the housing by a rotary shaft for motion between a first position at which the front lid closes the front opening portion and a second position remote therefrom, and spring means attached to the rotary shaft for biasing the front lid to the first position; the improvement comprising the spring means having a substantially U-shaped engagement end portion, and spring engagement projection means extending from front lid in a direction substantially parallel to the axis of the rotary shaft, the projection means having a tapered end portion leading to a lug portion, the U-shaped engagement end portion being expanded when urged against the tapered required end portion in direction so as to engage with a light pressure against the projection means in back of the lug portion.

These and other objects, features and advantages of the present invention will become apparent from the following detailed description of the preferred embodiment that is to be read in conjunction with the accompanying drawings, in which like references numerals identify like elements and parts.

BRIEF DESCRIPTION OF THE DRAWINGS

FIG. 3 is a longitudinal cross-sectional view of a relevant portion of a first prior art magnetic tape cassette;

FIG. 4 is a longitudinal cross-sectional view of a relevant portion of a second prior art magnetic tape cassette;

FIG. 5 is a perspective view of a relevant portion of a front lid of the second art magnetic tape cassette of FIG. 4;

DESCRIPTION OF THE PREFERRED EMBODIMENT

Figure 1:
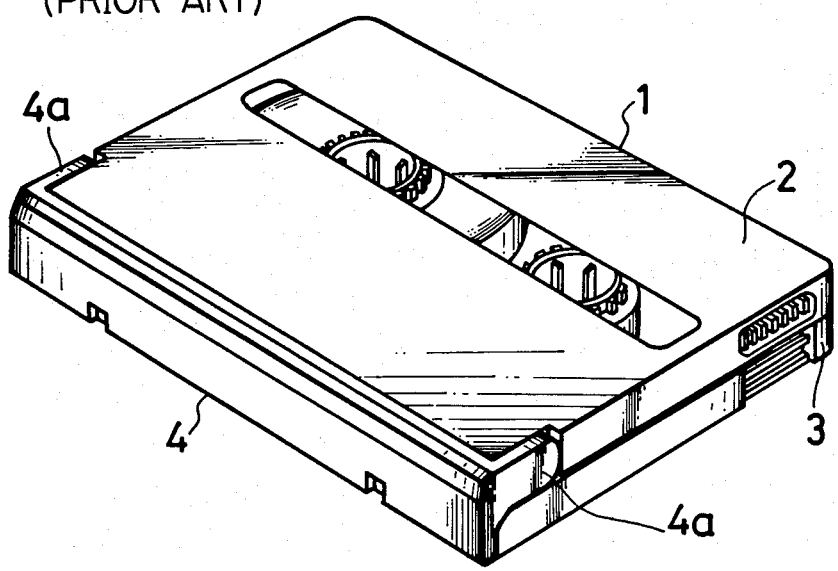
FIGS. 1 and 2 are perspective views illustrating an overall arrangement of a magnetic tape cassette having a rotatable front lid to which the present invention is applied.
Figure 2:
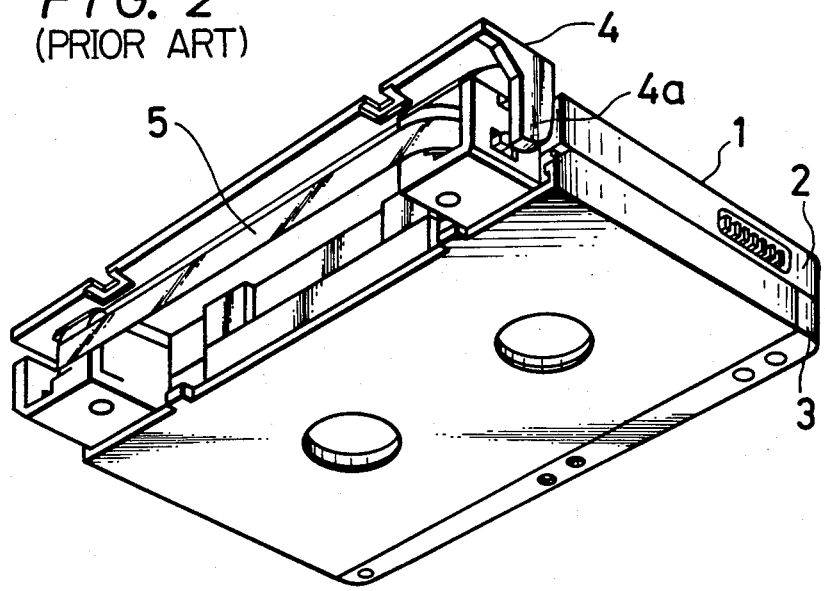
Figure 6:
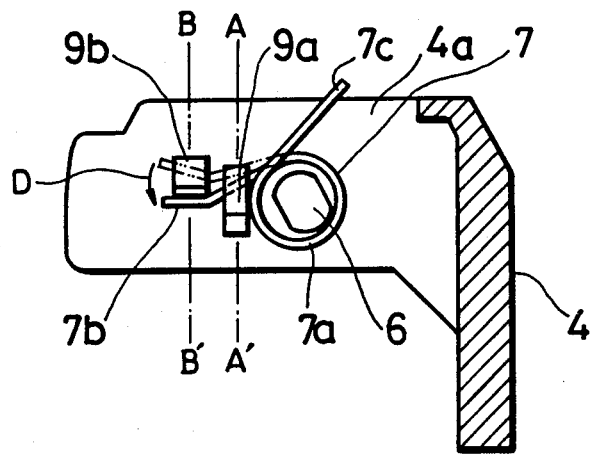
FIG. 6 is a side view showing a relevant portion of a third prior art magnetic tape cassette and which is used to explain how to attach a spring to its rotatable front lid.
Figure 8:
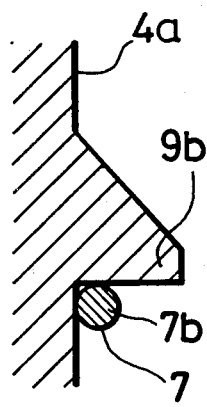
FIG. 8 is a cross-sectional view taken along line B—B' in FIG. 6.
Figure 7:
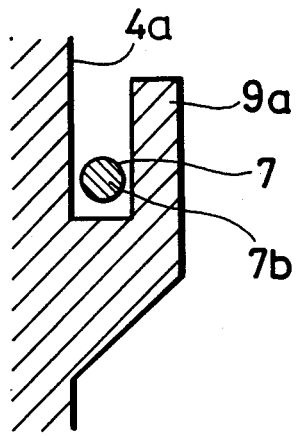
FIG. 7 is a cross-sectional view taken along line A—A' in FIG. 6.

The preferred embodiment of the magnetic tape cassette according to the present invention will hereinafter be described with reference to FIGS. 9 to 12. Throughout FIGS. 9 to 12, like parts corresponding to those of FIGS. 1 to 8 are marked with the same reference numerals and will not be described in detail.

In the magnetic tape cassette according to the present invention, one end of twist coiled spring 7 is curved into a substantially U-shaped portion to form an engagement end portion 10. A spring engagement projection 11 corresponding to engagement end portion 10 of spring 7 is formed on the inner surface of side portion 4a of front lid 4 at a position to the rear of rotary shaft 6 and extends in a direction substantially parallel thereto.

Figure 9:
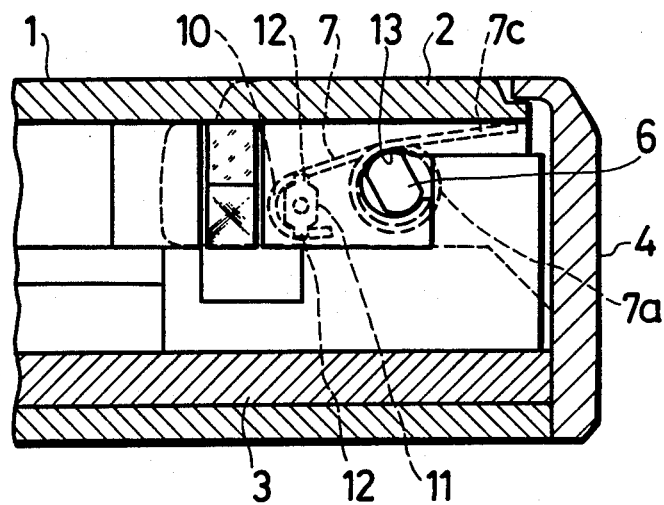
FIG. 9 is a longitudinal cross-sectional side view of a relevant portion of an embodiment of a magnetic tape cassette according to the present invention.

As illustrated in FIG. 9 spring engagement projection 11 is formed by cutting away the front and rear side portions of a cylindrical projection in its extending or projecting direction. A diameter a of spring engagement projection 11 is selected to be equal to or slightly larger than a diameter b of engagement end portion 10 of spring 7 (see FIG. 11A). Spring engagement projection 11 has a tapered top portion 11a and a pair of opposed lugs 12 protrusively extending from tapered top portion 11a across a diameter of spring engagement projection 11.

Figure 10:
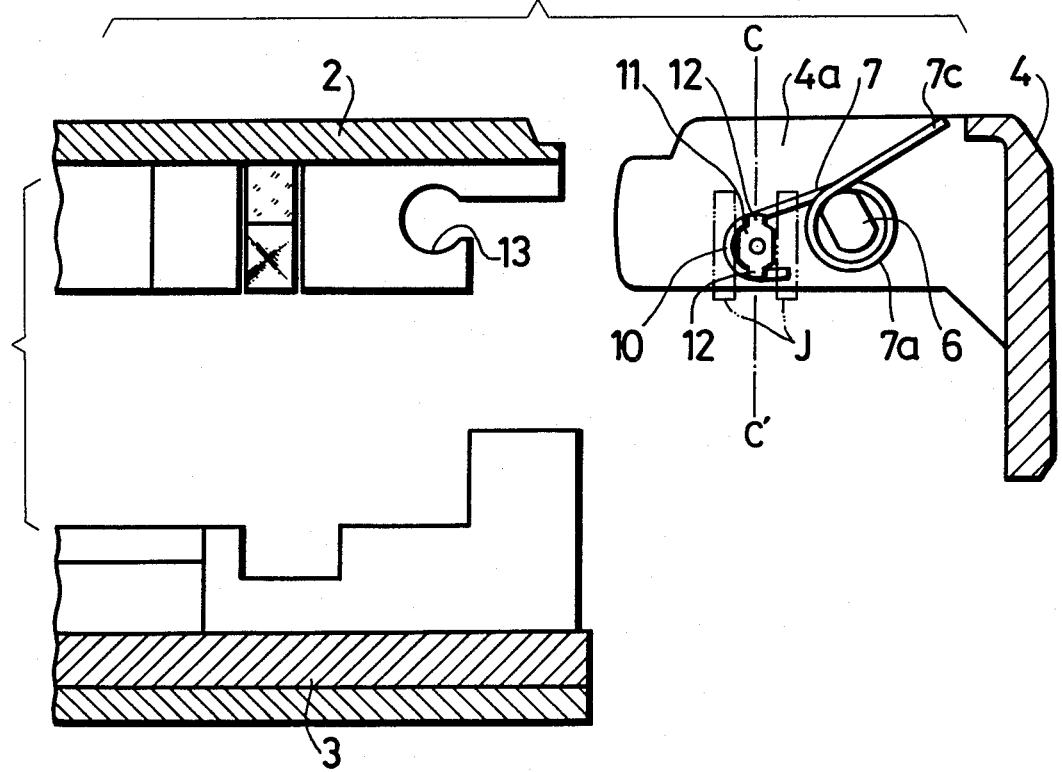
FIG. 10 is an exploded view of the magnetic tape cassette of FIG. 9.
Figure 11A:
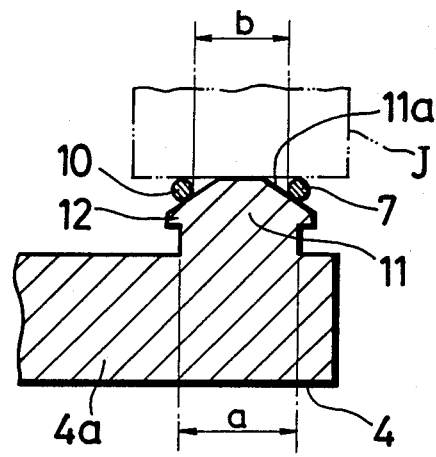
FIGS. 11A to 11C are each cross-sectional views taken along line C—C' in FIG. 10 and used to explain how to attach the spring to the front lid in the magnetic tape cassette according to the present invention.
Figure 11B:
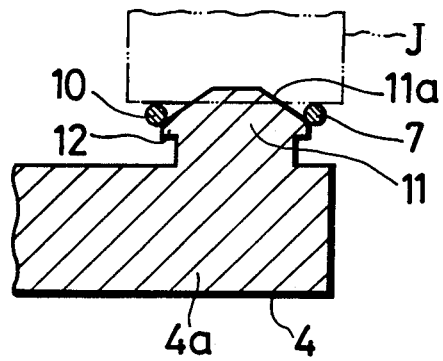
Figure 11C:
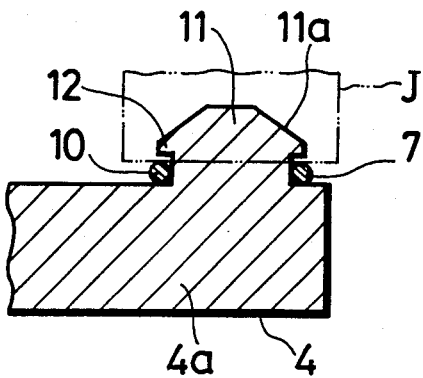
Figure 12A:
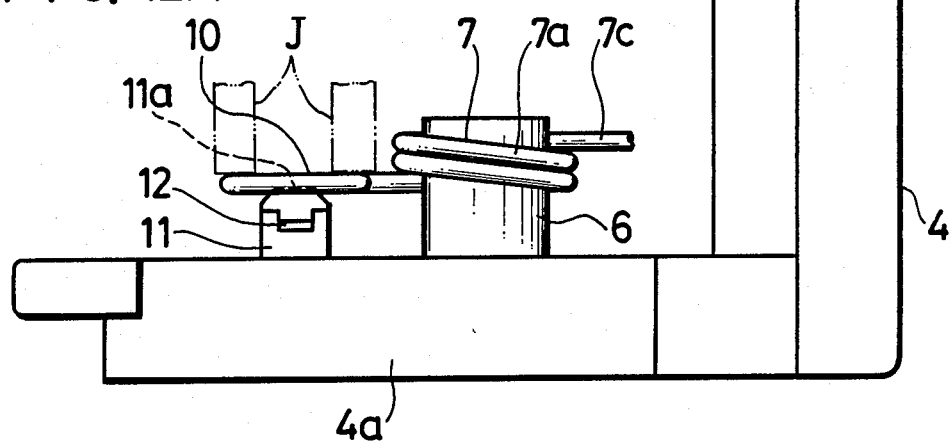
FIGS. 12A to 12C are diagrams respectively used to explain how to attach the spring to the front lid in the magnetic tape cassette according to the present invention.
Figure 12B:
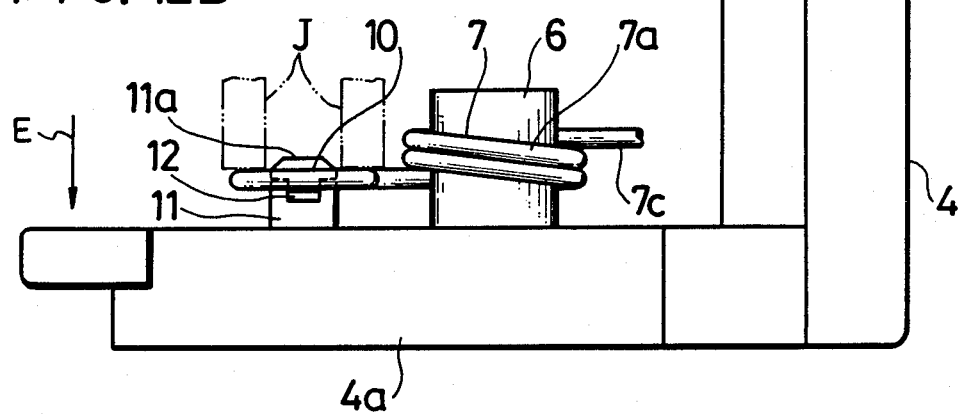
Figure 12C:
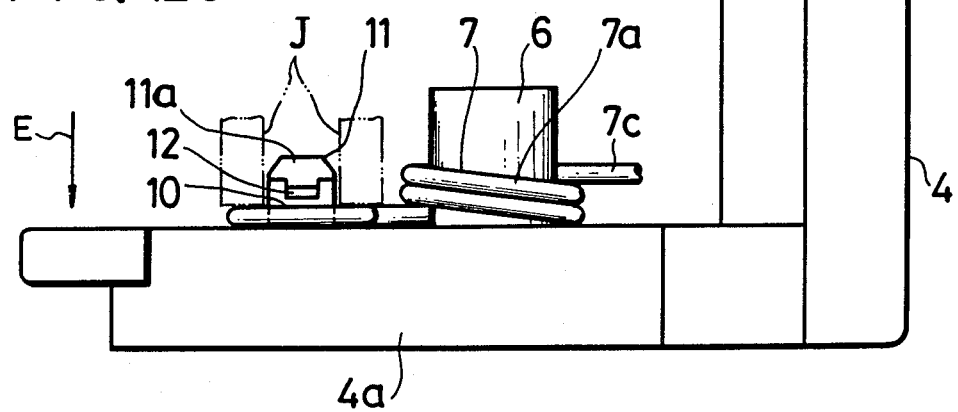

During the assembly process, spring 7 is attached to front lid 4 as follows. Initially, coiled portion 7a of spring 7 is slid onto rotary shaft 6 by movement along its projecting direction until U-shaped engagement portion 10 touches the top of spring engagement projection 11 as shown in FIGS. 11A and 12A. When engagement end portion 10 of spring 7 is then pushed further along the projecting direction of spring engagement projection 11 toward the base portion thereof, that is, in the vertical direction shown by an arrow E in FIG. 12B, by a pair of spring press jigs J of an automatic spring attaching machine (not shown), engagement portion 10 of spring 7 is expanded to move slidably along the tapered surface of tapered top portion 11a of spring engagement projection 11, increasing its diameter as shown in FIGS. 11B and 12B. When spring 7 is further pushed in this same direction shown by the arrow E in FIG. 12C by the pair of jigs J, the U-shaped engagement portion 10 passes over the lugs 12 and engages the base portion of the spring engagement projection 11 with a light pressure, as shown in FIGS. 11C and 12C. In this case, the automatic spring attaching machine locates the pair of jigs J one at a time so as to catch spring engagement projection 11 therebetween, as shown in FIGS. 10 and 12A.

Front lid 4 with spring 7 thus attached thereto may then be attached to cassette housing 1 by a process similar to that used for the prior art magnetic tape cassette. That is, rotary shaft 6 is engaged with a bearing portion 13 (FIG. 10) formed on upper half 2 and end portion 7c of spring 7 is moved into contact with the back surface of the upper portion of upper half 2, thus attaching front lid 4 to cassette housing 1. When front lid 4 is thus attached to cassette housing 1, spring 7 engages with spring engagement projection 11 with a light pressure and lugs 12 prevent spring 7 from escaping from front lid 4. Consequently, spring 7 is prevented from falling off front lid 4 accidently during assembly, and so front lid 4 with spring 7 attached can be assembled with cassette housing 1 easily and positively.

In accordance with the present invention, spring 7 can be positively attached to front lid 4 simply by pressure on spring 7 by the pair of jigs J so as to engage it with spring engagement projection 11. In this assembly process, since the direction in which spring 7 is moved to engage it with rotary shaft 6 and the direction in which spring 7 is moved to engage it with spring engagement projection 11 are the same, spring 7 is completely attached to front lid 4 by motion in a single direction. As a result, spring 7 can be attached to front lid 4 with considerably improved efficiency and by automatic means.

While spring engagement projection 11 may be formed with the pair of lugs 12 in the vertical direction thereof (see FIGS. 9 and 10), it may alternatively be formed with a lug portion 12 around the whole periphery thereof.

In accordance with the present invention as set forth above, the spring used for pivotally biasing the front lid is provided with a substantially U-shaped engagement end portion and a spring engagement projection corresponding to the above engagement end portion of the spring and having a tapered top portion and a lug portion is formed at the front side lid to project parallel to the rotary shaft, the spring engagement end portion engaging the spring engagement projection with a light pressure to attach the spring to the front lid positively. The assembly of the spring with the rotary shaft and the assembly of the spring with the spring engagement projection can be carried out by movement in the same direction. Consequently, the spring can be attached to the front lid with an efficiency considerably improved as compared with the prior at magnetic tape cassette. Further, the spring can be attached to the front lid automatically.

In addition, since the magnetic tape cassette of the invention is simple in construction, the assembly work of the magnetic tape cassette can be improved in efficiency without increasing the manufacturing cost thereof. Thus, the magnetic tape cassette of the invention presents great practical advantages.

The above description is given on a single preferred embodiment of the invention, but it will be apparent that many modifications and variations could be effected by one skilled in the art without departing from the scope of the invention so that the scope of the invention should be determined by reference to the appended claims only.

We claim:

1. In a magnetic tape cassette including a housing having a front opening portion and a lid mounted to said housing by a rotary shaft extending from said lid along an axis, said lid being pivotable about said axis between a first position in which said lid closes said front opening portion and a second position remote therefrom, and spring means attached to said rotary shaft for biasing said lid to said first position;

the improvement wherein said spring means comprises an expansible, substantially U-shaped engagement end portion displaced from said axis, and further comprising spring engagement projection means having a front end and a back end and extending from said lid in a direction substantially parallel to the axis of said rotary shaft, said back end connected to said lid and said front end extending therefrom, said projection means further having a lug portion located between said front end and said back end and a tapered end portion on said front end leading to said lug portion, said U-shaped engagement end portion expanding when urged against said tapered end portion in a direction so as to snap over said lung portion and then contracting so as to engage with a light pressure against said back end of said projection means.

2. A magnetic tape cassette as in claim 1, wherein said lug portion is constituted by first and second opposed lugs.

3. A magnetic tape cassette as in claim 1, in which said spring means has a coiled middle portion and a second end portion, said coiled portion being engaged with said rotary shaft and said second end portion contacting said cassette housing.

* * * * *